(No Model.) 3 Sheets—Sheet 2.

J. M. ULSH.
HARROW.

No. 391,494. Patented Oct. 23, 1888.

WITNESSES:
Chas. Nida
C. Sedgwick

INVENTOR
J. M. Ulsh
BY Munn & Co
ATTORNEY.

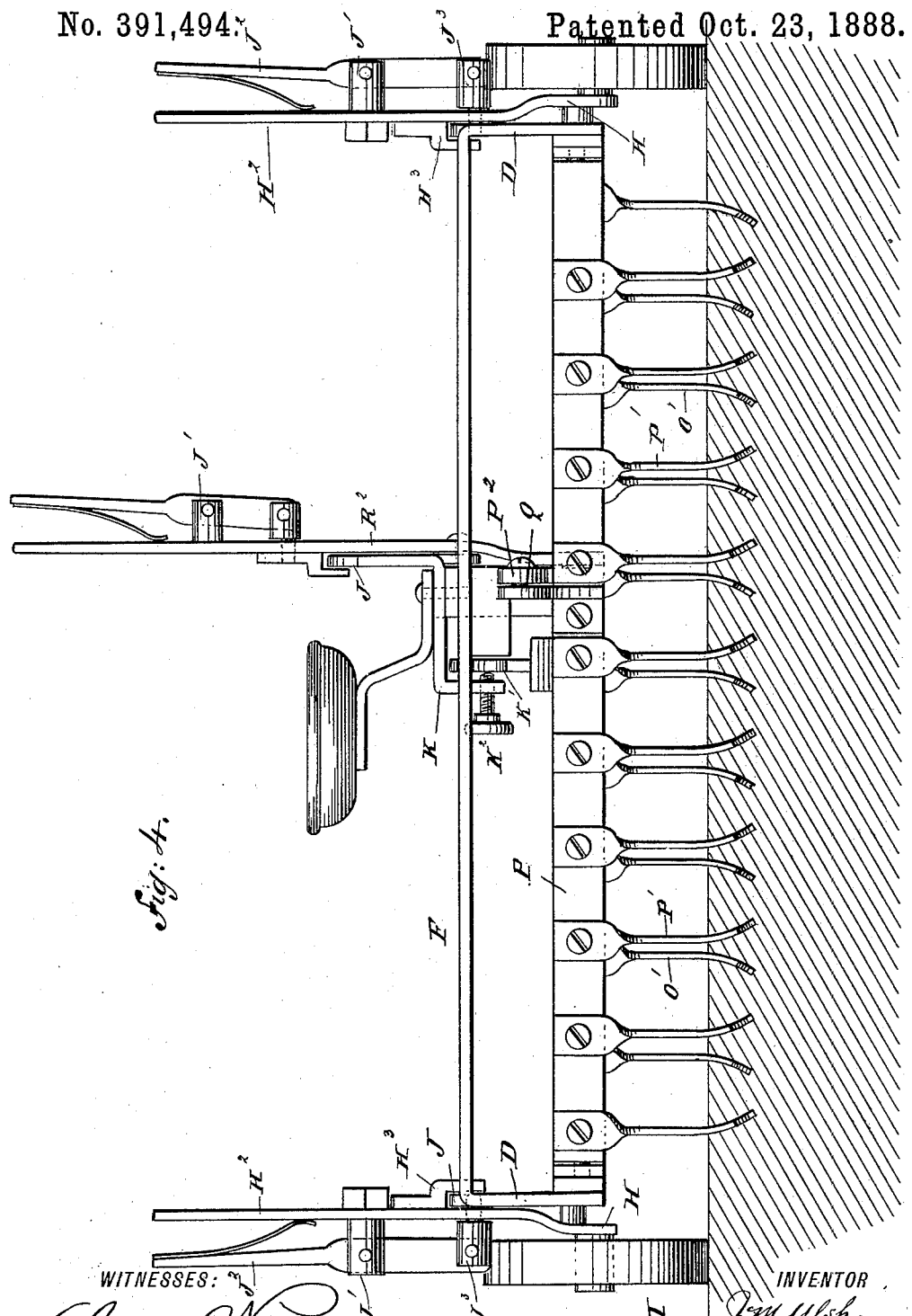

UNITED STATES PATENT OFFICE.

JAMES M. ULSH, OF STEELTON, PENNSYLVANIA, ASSIGNOR OF ONE-HALF TO CARTER DE MURGUIONDO, OF BROOKLYN, NEW YORK.

HARROW.

SPECIFICATION forming part of Letters Patent No. 391,494, dated October 23, 1888.

Application filed April 27, 1888. Serial No. 272,031. (No model.)

*To all whom it may concern:*

Be it known that I, JAMES M. ULSH, of Steelton, in the county of Dauphin and State of Pennsylvania, have invented a new and useful Improvement in Harrows, of which the following is a full, clear, and exact description.

The object of this invention is to provide a simple and efficient harrow in which the harrow-teeth can be conveniently adjusted to enter the ground any required depth or at any desired angle, can as readily be raised out of action any desired height above the ground, and can be easily and securely locked in any of their adjustments.

The invention consists of various novel features of construction and combination of parts, which will be hereinafter set forth in detail, and distinctly pointed out in the claim.

Reference is to be had to the accompanying drawings, forming a part of this specification, in which similar letters of reference indicate corresponding parts in all the figures.

Figure 1:
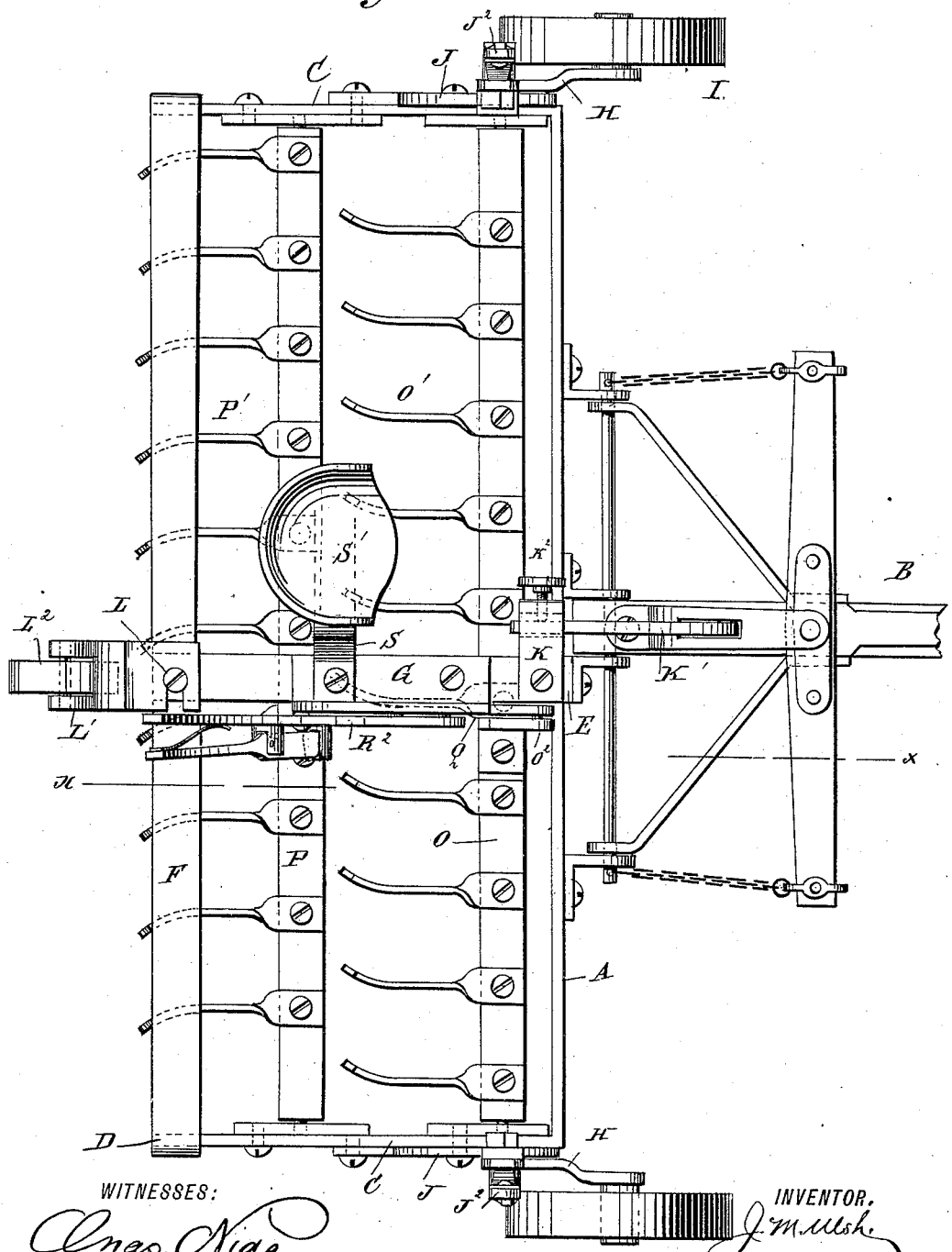
Figure 2:
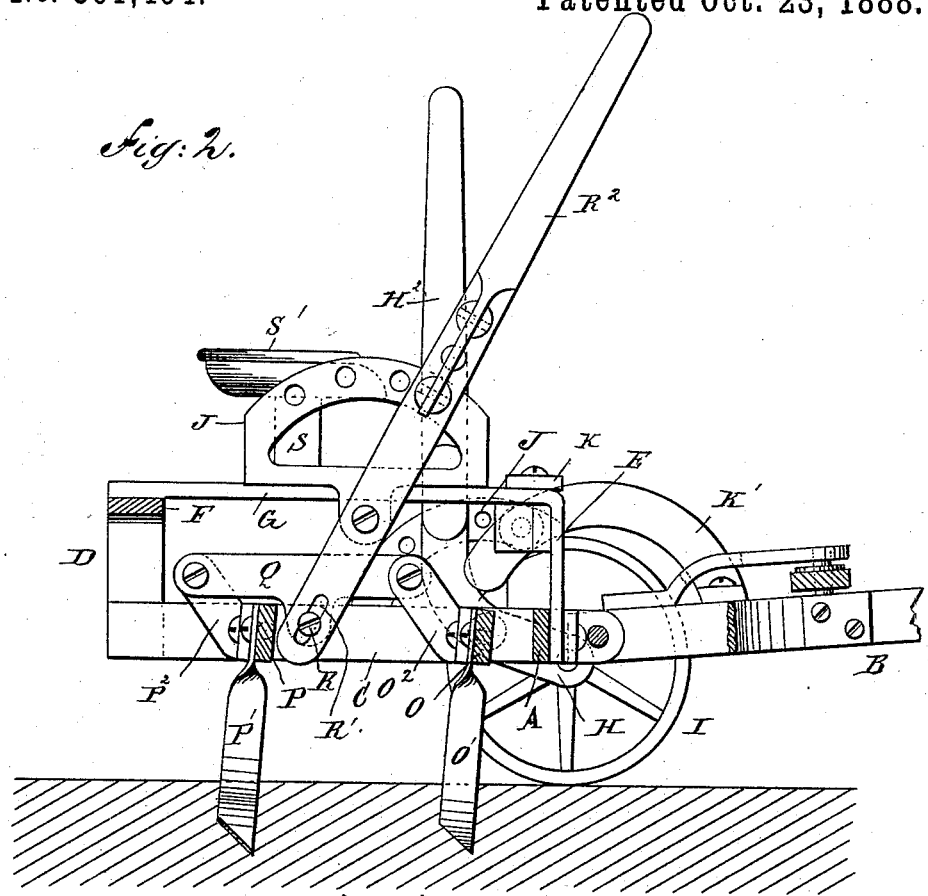
Figure 3:
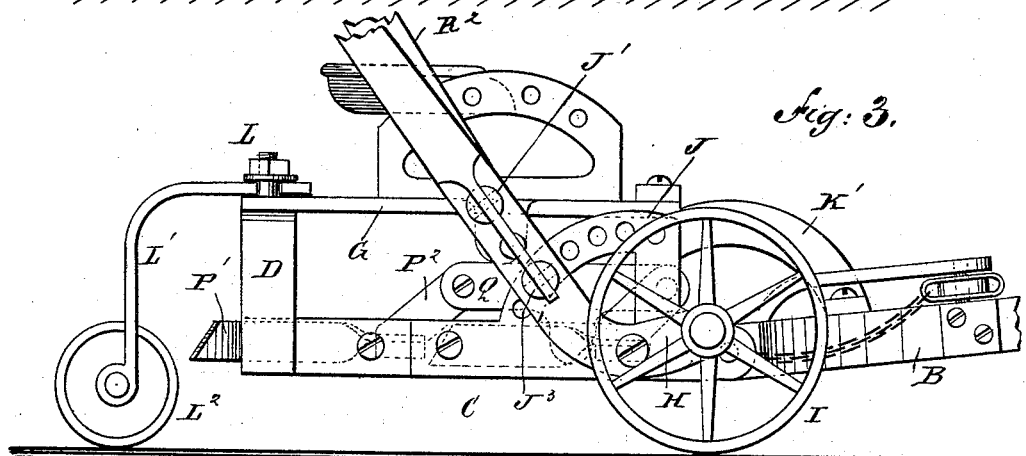

Figure 1 is a plan view of a harrow embodying my improvement when the teeth are raised out of action. Fig. 2 is a sectional side elevation of the said harrow on the line $x\,x$ of Fig. 1, when the teeth are adjusted to enter the ground nearly in a vertical position. Fig. 3 is a side elevation of the harrow when the teeth are raised out of action, but the frame of the machine is in a lower adjustment; and Fig. 4 is a rear elevation of the harrow when adjusted as represented in Fig. 2.

In the harrow thus illustrated the frame of the machine is formed of a front cross-beam, A, to the center of which the tongue B and other draft devices are connected, side beams, C, fixed at the forward ends to the respective ends of the draft-beam A, standards D E, fixed to and rising from the rear ends of the side beams, C, and the middle of the draft-beam A, respectively, a cross-brace, F, rigidly connecting the upper ends of the rear standards, D, and a longitudinal brace, G, rigidly connecting the upper end of the front standard, E, to the middle of the cross-brace F, the braces F and G being thus elevated above the remainder of the frame.

To the outside of the side beams, C, near the front ends thereof, are pivoted, at their angles, elbow-levers H, the shorter arms of which project forward and form at their ends bearings for the axles of the main supporting-wheels I, and the longer arms, $H^2$, of which project upward and form handles, by swinging which the wheels' bearings can be adjusted at any desired height with respect to the frame and the latter thus caused to travel at any desired height above the ground.

On the side beams, C, are fixed upright segmental plates J, upon the outer faces of which the handle-arms $H^2$ of the adjusting-levers H are adapted to ride, said arms $H^2$ being provided on their inner faces with keepers $H^3$, between which and the arms the segmental plates J are embraced, so as to guide the movement of the arms.

To the outer face of each arm $H^2$ is fixed a stud, J', having a cross-slot, in which is pivoted a spring-pressed locking-lever, $J^2$, the lower end of which is pivoted within the slotted head of a pin, $J^3$, mounted to work through a hole formed in the arm $H^2$ and through either of a segmental series of holes, which are formed in each plate J, so that the arms $H^2$, and hence the elbow-levers H, can be readily locked in any position to which they may be adjusted.

On the front end of the elevated brace G is fixed a keeper, K, to receive adjustably a segmental bar, K', fixed to the draft-tongue B and having a set-screw, $K^2$, by which the frame of the machine may be rigidly connected to the tongue at any height, and the rear part of the frame thus held aloof from the ground, as in going to or from the field under cultivation. The rear end of the elevated brace G is further provided with a fastening device, L, for securing rigidly but detachably to the frame of the machine the brace-bearing L' of a trail-wheel, $L^2$, so that when the machine is not in operation the frame can be supported at the front as well as the rear, and when it is to be used the said wheel can be readily detached.

In bearings fixed to the inside of the side beams, C C, near the front and rear ends thereof, are mounted to turn the end pivots of two transverse tooth-bars, O and P, respectively, to which are attached at their forward ends rows of teeth O' P', which are formed of oblong flat metal plates secured flatwise upon the respective bars O P, twisted medially at right angles to lie edgewise with the length of the machine, beveled at their outer ends, and curved thereat laterally, the teeth O' in one direction and the teeth P' in the opposite direction, the construction and arrangement being such that the points of the teeth of each row will alternate in position with those in the other, and that by properly turning the tooth-bars O and P on their pivots the teeth can all be swung up into the plane of the frame of the machine, so as to be inactive, as shown in Figs. 1 and 3, or downward in an approximately vertical position, as shown in Figs. 2 and 4, so as to cut the ground edgewise, or into any intermediate position desired.

The two bars O and P are provided at their middles with like upwardly-projecting arms $O^2$ $P^2$, respectively, rigidly attached thereto, which arms are connected together by a longitudinal bar, Q, pivoted at its ends thereto, so that the two tooth-bars will be compelled to work in unison, and on a downward projection of the bar Q is fixed a pin, R, which is received and rides in the slot R', formed on the lower end of a lever, $K^2$, which is pivoted to the elevated brace G, and is extended thereabove to form a handle, by properly working which the two rows of teeth can be easily adjusted together to any of the positions previously described.

On the brace G is fixed the segmental plate J of a guiding and locking device for the lever $R^2$, like that described in connection with elbow-levers H, and also a brace, S, on which a central seat, S', is fixed, so as to be within convenient reach of the teeth-adjusting lever $R^2$.

By means of the mechanism thus provided for adjusting the angle of inclination of the teeth to the ground, and also their depth of entrance into the ground, the harrow can be easily and accurately suited to all classes of work.

Having thus fully described my invention, I claim as new and desire to secure by Letters Patent—

The combination, with the frame comprising the front cross-bar, A, having two end bars, C, provided at their rear ends with vertical standards D, connected by the cross-bar F, the vertical standard E on the center of the bar A, and the longitudinal bar G, connecting the bar F and standard E, of the transverse tooth-bars P, journaled in the ends C, a locking mechanism, the keeper K on the front standard, E, and having a transverse set-screw, the tongue, and the segment K', secured to the rear end of the tongue and extending through the keeper K, substantially as set forth.

JAMES M. ULSH.

Witnesses:
WALTER L. THOMPSON,
ISRAEL V. BUSER.